United States Patent [19]

Hini et al.

[11] 3,971,253

[45] July 27, 1976

[54] FLOW METER WITH A MAGNETIC FIELD-DEPENDENT RESISTOR ARRANGEMENT

[75] Inventors: Paul Hini, Erlangen-Kosbach; Bernt Paul, Erlangen, both of Germany

[73] Assignee: Siemens Aktiengesellschaft, Munich, Germany

[22] Filed: June 19, 1975

[21] Appl. No.: 588,236

[30] Foreign Application Priority Data
July 19, 1974 Germany............................ 2434864

[52] U.S. Cl. ................................................. 73/228
[51] Int. Cl.² ............................................. G01F 1/28
[58] Field of Search ................ 73/194 E, 228, 186; 338/32 R

[56] References Cited
UNITED STATES PATENTS
3,164,018  1/1965  Bennett................................. 73/228
3,287,968  11/1966  Kenyon.................................. 73/186

*Primary Examiner*—James J. Gill
*Attorney, Agent, or Firm*—Kenyon & Kenyon Reilly Carr & Chapin

[57] ABSTRACT

The invention is a flow meter comprising a magnetic field-dependent resistor arrangement whose resistances are controlled by a particularly configured control member. More specifically, the position of the control member controls the degree of flux passing from the permanent magnet of the resistor arrangement through the two magnetic field dependent resistors of the arrangement. The resistance values of the resistors thus vary as a function of the position of a control member. According to the invention, the control member comprises a throttle plate having one end clamped elastically to the flow chamber of the meter and the other end within and free to move with the medium flowing in the chamber.

In this manner, by varying the pressure head of the flowing medium, the amplitude of motion of the throttle plate, and, hence, the resistance values controlled thereby are varied. A sensitive flow meter having a simple construction is thus realized.

4 Claims, 4 Drawing Figures

U.S. Patent July 27, 1976 3,971,253

FLOW METER WITH A MAGNETIC FIELD-DEPENDENT RESISTOR ARRANGEMENT

BACKGROUND OF THE INVENTION

1. Field of the Invention

The present invention relates to a flow meter and, in particular, to a flow meter comprising a magnetic field-dependent resistor arrangement.

2. Description of the Prior Art

In a known flow meter of the above-described type, the magnetic field dependent resistor arrangement comprises two resistors or field plates which are disposed in the magnetic flux of a permanent magnet and whose difference in resistance determines the output signal of the meter. In this arrangement, the resistance values of the field plates and, thus, the output signal of the meter, are controlled by a ferromagnetic control member which is movably arranged in the flowing medium of the meter and whose position controls the degree of flux permeating at least one of the field plates.

It is a primary object of the present invention to provide a flow meter of the above type which is of simple design and which has improved signal generating capabilities.

SUMMARY OF THE INVENTION

In accordance with the principles of the present invention, the above and other objectives are accomplished by providing in a flow meter of the above-described type, a ferromagnetic control member which includes a throttle plate having one end clamped elastically to the housing of the flow chamber or channel of the meter and the other end free to move with the flow of the medium flowing in the channel and relative to the magnetic flux passing through the field plates of the resistor arrangement included in the meter. With the throttle so arranged, the force of the pressure head of the flowing medium and, hence, the rate of flow of the medium controls or determines the amplitude or degree of deflection of the throttle plate end. The degree of throttle deflection, in turn, controls the amount of magnetic flux distributed to the two field plates, and, thus, the resistance values of the plates. As a result, when the plates are disposed in different branches of a conventional bridge circuit, an output signal is obtained from the bridge circuit which is a function of the resistance values of the field plates and, hence, is a measure of the rate of flow of the flowing medium.

In a first embodiment of the invention, an elastic bending element is employed as the throttle plate. More particularly, the bending element is in the form of a thin disc, one end of which is clamped to the wall of the flow chamber and the other end of which is in the flowing medium. Advantageously, the thin disc may be part of a razor blade or may be a leaf spring.

In a second embodiment of the invention, a frame-shaped member is employed as the throttle plate. This member encloses the magnetic field-dependent resistor arrangement and has one end which protrudes into the flowing medium. Additionally, the member is spring-mounted at opposite outer portions of the meter housing in such a manner that, with the motion of its end protruding into the flowing medium, the parts of the member coupled to the meter housing act as torsion springs. The clamping of the member is preferably made so that the line connecting the points of connection of the member and housing, goes through the center of gravity of the member.

BRIEF DESCRIPTION OF THE DRAWING

The above and other features of the invention will become more apparent upon reading the following detailed description taken in conjunction with the following drawings, in which.

DETAILED DESCRIPTION OF THE PREFERRED EMBODIMENT

Figure 1:
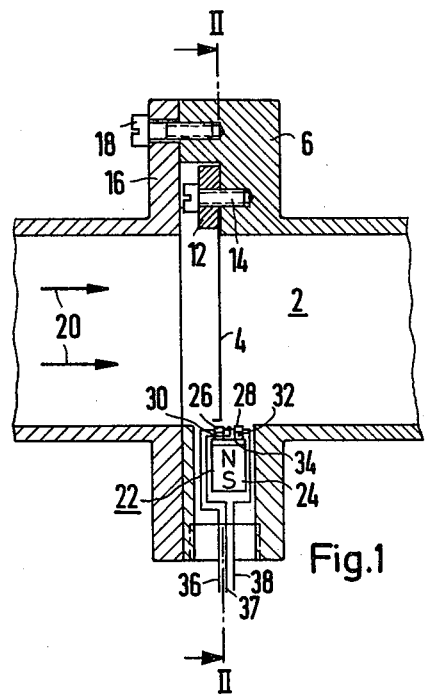
FIGS. 1 and 2 illustrate, in longitudinal and transversal cross sections, respectively, a first embodiment of a flow meter in accordance with the invention.

As shown in FIG. 1, a flow meter in accordance with the invention has a flow channel 2 within which is disposed a ferromagnetic control member which is in the form of throttle plate 4 whose upper end is clamped at a flange 6 of a tubular housing 8 which forms the flow channel 2. As illustrated, the plate 4 is clamped to the flange 6 using a clamp 12 having a screw 14. Another flange 16 of the housing 8 is fastened to flange 6 by means of a screw connection 18. Flowing through channel 2 is the medium whose flow rate is to be measured. The flow of this meduim is indicated by the arrows 20.

As can be seen, the lower end of the throttle plate 4 extends within the flow channel 2 and is free to move with the flow of the flowing medium therein. Moreover, this end of plate 4 is within the magnetic flux of a magnetic field dependent resistor arrangement 22 comprising a permanent magnet 24 and two field plates or resistors 26 and 28 which are disposed on the faces of hump-like extensions 30 and 32, respectively. By means of a separator 34, the extensions 30 and 32 are fastened to the pole surface marked N of the permanent 24. The two field plates 26 and 28 comprise a semiconductor compound, in particular indiumantimonide, which may preferably include, in addition, embedments, oriented parallel to each other, of a second crystalline phase of electrically highly conducting material, in particular nickel-antimonide. Moreover, the two field plates 26 and 28 are electrically connected to each other, and the conductor connecting them is provided with a center tap. Electrical leads designated 36, 37 and 38 are connected to the plate 26, center tap and plate 28, respectively. A magnetic field dependent resistor arrangement of the above type is described in German Offenlengungsschrift No. 2,238,525.

Figure 2:
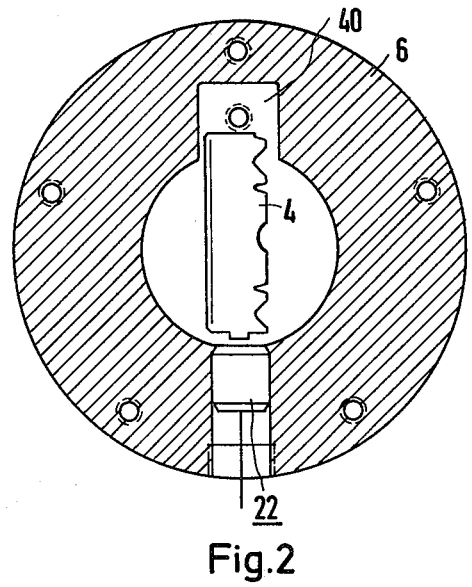

As shown more clearly in FIG. 2, in this embodiment of the flow meter the throttle plate 4 is in form of half of a razor blade, its upper end being clamped in the recess 40 of the flange 6. Accordingly, in this embodiment the throttle plate 4 is itself elastic and, thus functions as a spring-like ferromagnetic control member. It should be noted that operation of the invention only requires that the lower end of the throttle plate 4 be comprised of a ferromagnetic material.

In the normal position of the throttle plate 4, its lower end is located, for instance, above the field plate 26 so that the stray flux of the permanent magnet 24 essentially permeates the latter field plate only. When the lower end of the throttle plate 4 is deflected by the flow 20 of the medium in channel 2, the stray flux of the magnet 24 then shifts toward the field plate 28, the degree of shift being dependent upon an amount of deflection and, hence, the rate of the flow 20, and being such as to cause the entire flux to substantially permeate the field plate 28 at a maximum flow (i.e., a flow which results in deflection of the throttle 4 so it resides above the field plate 28). As can be appreciated, this shift in flux toward field plate 28 and, hence, away from field plate 26 causes an increase in the induction and, therefore, the resistance of the former plate and a corresponding decrease in the induction and, therefore, the resistance of the latter field plate. A net resistance change between the plates is thereby obtained which corresponds to the degree of flux shift and, in turn, to the degree of change of the flow rate. As a result, by using conventional electrical circuitry (e.g., a bridge circuit) to derive a signal corresponding to the resultant resistance change, a signal indicative of the flow rate is thereby obtained.

Figure 4:
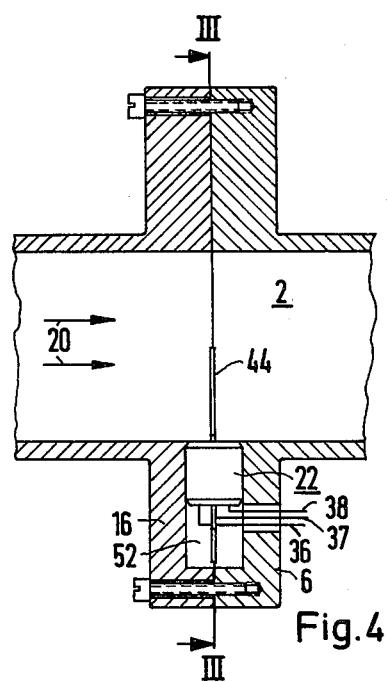
FIGS. 3 and 4 show respective sectional views of a second embodiment of the invention.
Figure 3:
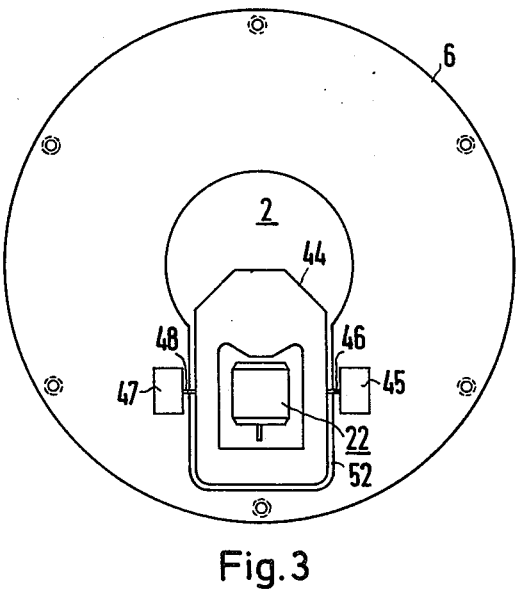

FIGS. 3 and 4 show a second embodiment of a flow meter according to the invention. This embodiment is similar to the embodiment in FIGS. 1 and 2 with the exception that the ferromagnetic control member is now in the form of a frame-shaped throttle plate 44 having a cutout or chamber in which is disposed the magnetic field dependent resistor arrangement 22. As can be seen, the upper end of plate 44 is located within the flow channel 2 and the lower end is movably disposed in a cutout 52 of the flanges 6 and 16. At its outer edge, the throttle plate 44 is provided with two extensions 45 and 47 which are fastened, e.g., clamped, to the flanges 6 and 16, respectively, by means of simple screw connections which are not shown in the figure.

In operation, the upper end of the frame-shaped throttle plate 44 is deflected from its normal position by the flow 20 in the channel 2. Such deflection, in turn, causes the magnetic flux permeating the field plates of the resistor arrangement 22 to vary in a similar manner as already described in the embodiment of FIGS. 1 and 2. Resistor arrangement 22, which is likewise fastened in the cutout 52 of the flanges 6 and 16, thus, when connected to a suitable electrical circuit (e.g., a bridge circuit) via leads 36 to 38, results in an output signal which is indicative of the rate of the flow 20.

As seen clearly in FIG. 3, the extensions 45 and 47 are preferably, connected to the throttle plate 44 via thin intermediate parts 46 and 48, respectively. These intermediate parts act like torsion springs, and, thus, provide the desired increases and decreases in deflection of plate 44 as a function of the increases and decreases, respectively, in the rate of flow 20. Advantageously, moreover, the position and arrangement of the extensions 45 and 47 are chosen so that the line connecting the extensions, via the intermediate parts 46 and 48, goes through the center of gravity of the throttle plate 44. This causes the operation of the flow meter to be insensitive to vibrations of the channel 2 and, thus, of the flanges 6 and 16.

As can be appreciated, due to the resilient or spring-like mounting of the throttle plate in the embodiments of the flow meter according to FIGS. 1 and 2, as well as, according to FIGS. 3 and 4, neither sliding friction, such as bearing friction, nor static friction, which would normally have to be overcome by the throttle plates 4 and 44, can occur. Advantageously, moreover, the flow meters in these embodiments are of a simple structural design and comprise relatively few components.

We claim:

1. A flow meter for use with a flowing medium comprising:
   a housing having a channel therein through which said medium can flow;
   a field dependent resistor arrangement including:
      a permanent magnet; and
      first and second magnetoresistive field plates arranged to be in the magnetic flux of said magnet; and
   a ferromagnetic control member for varying the degree of said flux permeating each of said plates, said control member including:
      a throttle plate extending into said channel, said throttle plate having one end elastically clamped to said housing and a portion which is within the magnetic flux of said magnet.

2. A flow meter in accordance with claim 1 in which said throttle plate comprises a thin elastic disc.

3. A flow meter for use with flowing medium comprising:
   a housing having a channel therein through which said medium can flow;
   a field dependent resistor arrangement including:
      a permanent magnet; and
      first and second magnetorestive field plates arranged to be in
   the magnetic flux of said magnet; and
   a ferromagnetic control member for varying the degree of flux permeating each of said plates, said control member including:
      a frame-shaped throttle plate which encloses said resistor arrangement, said throttle plate having an end which extends into said channel and a portion which is within the magnetic flux of said magnet, and including torsion spring-like members for mounting said plate to said housing.

4. A flow meter in accordance with claim 3 in which said torsion spring-like members are connected to said housing such that the points of connection are on a line that passes through the center of gravity of said plate.

* * * * *